(12) United States Patent
Virtanen

(10) Patent No.: US 6,741,704 B1
(45) Date of Patent: May 25, 2004

(54) METHOD OF SETTING ENCRYPTION FOR A CONNECTION IN A RADIO SYSTEM

(75) Inventor: Sami Virtanen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/559,838

(22) Filed: Apr. 26, 2000

Related U.S. Application Data

(63) Continuation of application No. PCT/FI98/00857, filed on Nov. 4, 1998.

(30) Foreign Application Priority Data

Nov. 4, 1997 (FI) .................................................. 974133

(51) Int. Cl.$^7$ ................................................ H04K 1/00
(52) U.S. Cl. ........................ 380/247; 380/255; 380/270
(58) Field of Search ................................ 380/255, 270, 380/247, 272, 271; 455/410, 422.1, 434, 426.1, 439, 420

(56) References Cited

U.S. PATENT DOCUMENTS

| | | | | |
|---|---|---|---|---|
| 5,717,762 A | * | 2/1998 | Aihara et al. | 380/274 |
| 5,761,619 A | * | 6/1998 | Danne et al. | 455/422.1 |
| 5,878,036 A | * | 3/1999 | Spartz et al. | 370/335 |
| 5,987,137 A | * | 11/1999 | Karppanen et al. | 380/28 |
| 6,249,584 B1 | * | 6/2001 | Hamalainen et al. | 380/270 |

FOREIGN PATENT DOCUMENTS

| | | |
|---|---|---|
| WO | 98/26538 | 6/1998 |
| WO | 98/37721 | 8/1998 |

OTHER PUBLICATIONS

International Search Report for PCT/FI98/00857, May 21, 1999.

"The GSM System for Mobile Communications" Mouly, et al, 1992.

* cited by examiner

*Primary Examiner*—Ayaz Sheikh
*Assistant Examiner*—Hosuk Song
(74) *Attorney, Agent, or Firm*—Squire, Sanders & Dempsey L.L.P.

(57) ABSTRACT

In combined systems of different radio systems, for example in a combined system of the radio access network (RAN) of the IMT-2000 system and the core network (MSC) of the GSM system, a problem exists in transferring encryption settings from a system element to the others. The present invention relates to a method of setting encryption for a connection in such a combined system, where the handling of the encryption settings of the switching centre (MSC) and the base station (BTS) of the radio network is carried out at different protocol layers than the handling of the encryption settings of the mobile terminals (MT). In the method, encryption is arranged for the connection between the radio access network (RAN) and the mobile terminal (MT), and an encryption setting is transmitted from the switching centre (MSC) to the control unit (BSC) of the radio access network (RAN). According to the invention, the method is characterized in that an encryption setting is transferred from the control unit (BSC) to the mobile terminal (MT) transparently from the point of view of the base station.

7 Claims, 7 Drawing Sheets

METHOD OF SETTING ENCRYPTION FOR A CONNECTION IN A RADIO SYSTEM

This application is a continuation of international application Ser. No. PCT/FI98/00857, filed Nov. 4, 1998.

FIELD OF THE INVENTION

The present invention relates to a method of setting encryption for a connection in a radio system that comprises a plurality of mobile terminals, at least one switching centre and at least one radio network unit communicating with the switching centre, the radio network unit further comprising at least one control unit and at least one base station under its control. In the radio system, the handling of the encryption settings of the switching centre and the base station is performed at different protocol layers than the handling of the encryption settings of the mobile terminals.

BACKGROUND OF THE INVENTION

The present-day requirement of public radio systems is mutual compatibility. At times, it is further required that units of different systems can be combined into a workable entity, for example the use of a base station system in core networks of different radio systems. FIG. 1 shows such a combination of a plurality of radio systems, in which a Radio Access Network (RAN) is connected to core networks of different systems, in the figure to the core networks of a Global System for Mobile Communications (GSM), International Mobile Telecommunication (IMT-2000), General Packet Radio Service (GPRS) and Integrated Services Digital Network (ISDN). Such a radio access network RAN is planned to be implemented in the IMT-2000 system of the future. By means of the RAN network, a radio connection is established to subscribers of several core networks. Consequently, it is also referred to as a Generic Radio Access Network (GRAN). Each core network provides services to its own subscribers. The mobile terminal (MT) is thus connected to a base station BTS of the radio access network RAN via the radio path over the radio interface. Via the BTS, the connection is transferred from the radio access network RAN to the home core network of the mobile terminal MT over the interface $I_u$. The $I_u$ interface refers to an open interface that can be used to interconnect the RAN of different systems and a Core Network (CN). A core network refers to a Mobile Services Switching Centre (MSC) and the other units in the network, such as the Visitor Location Register (VLR), the Home Location Register (HLR), etc. depending on the system. The $I_u$ is illustrated as comprising the BN protocol (Bearer Negotiation) of layer 3 and the lower physical transmission layers. A core network can also be made up of separate packet service nodes such as General Packet Radio Service (GPRS), Serving GPRS Support Node (SGSN) and Gateway GPRS Support Node (GGSN) of the GSM.

FIG. 2 shows the connection of the GSM core network to the radio access network RAN in closer detail. The RAN consists of at least one base station controller (BSC) and base stations BTS under its control. Unlike with operation of the GSM network, the signaling between the RAN network and the mobile terminal in the IMT-2000 system is often transparent to the base station BTS. Thus, the structure of the BTS functioning as a repeater in the signaling between the BSC and the MT is simpler than in traditional mobile communications systems. The base station controller BSC routes the messages from the mobile terminal MT, received via the base station BTS, to the mobile services switching centre MSC of the GSM system, and vice versa.

The problem with connecting the IMT-2000 system radio access network RAN and, e.g., the GSM system core network to one another is arranging encryption for the connections. In the IMT-2000 system, encryption is implemented between the mobile terminal MT and the core network MSC, which makes traffic transparent from the point of view of the radio access network RAN. In the GSM system, encryption is implemented at the air interface between a mobile station MS and a base station BTS. The next examines in closer detail the problem caused by a combined system in the light of FIGS. 3–6.

FIG. 3 illustrates a theoretical layer description for a connection in the GSM system entity, in which identically-named protocols of units connected to each other communicate with each other. For reasons of clarity, physical transmission layers 1 and 2 that do not take part in the encryption are marked with dotted lines. Boxes circled with solid lines in the figures belong to layer 3. Of the protocols shown in the figure, CC (Call control) carries out call control and MM (Mobility Management) location management of the mobile station MS. In the GSM system, these protocols do not take part in implementing encryption for the connection.

FIG. 4 is a signaling diagram for setting of encryption in the GSM system. FIG. 4 also shows the taking part of the protocol boxes of FIG. 3 in the setting of the encryption. With a BSSAP protocol, the mobile services switching center MSC transmits an encryption start command 41 CIPHERING_MODE_COMMAND to the BSSAP protocol of the base station controller BSC. The BSSAP (BSS Application Part) protocol corresponds to the BN protocol. BSC-internally, the start command is transferred in message 42 from the BSSAP protocol to the BTSM protocol (BTS Management) that is able to communicate with the corresponding protocol of the base station BTS. The BTSM protocol of the base station controller BSC thus transfers the encryption command to the BTSM protocol of the BTS in message 44 ENCRYPTION_COMMAND, which includes a CIPHERING_MODE_COMMAND message of an RR protocol (Radio Resource Management), meant to be transmitted to the mobile station MS. BTS-internally, the encryption command is transferred, in message 45, from the BTSM protocol to an RR' protocol which is part of the RR protocol and thus capable of communicating with the RR protocol of the mobile station MS. The RR' protocol of the base station BTS transfers the CIPHERING_MODE_COMMAND message, delivered within message 44, to the RR protocol of the MS (message 46). The RR protocol of the mobile station MS acknowledges the encryption setting by transmitting an acknowledgement message 47 CIPHERING_MODE_COMPLETE to the RR protocol of the base station controller BSC. BSC-internally, this acknowledgement is transferred from the RR protocol to the BSSAP protocol (message 48) that sends the acknowledgement message further to the BSSAP protocol of the mobile services switching centre in message 49 CIPHERING_MODE_COMPLETE. The RR protocol of the mobile station MS and the RR' protocol of the base station BTS transfer the encryption parameters and the encryption start command unit-internally to lower layers of the physical connection, which at the transmitting end carry out encryption and, at the receiving end, decryption for signals of the higher protocols.

FIG. 5 shows a theoretical layer description corresponding to FIG. 3 in the case of IMT-2000 system entity. Again, the physical transmission layers 1 and 2 not taking part in the encryption are marked with dotted lines. Layers 1 and 2 may be implemented with the ATM protocol, for example. The CC protocol of the IMT-2000 system carries out call control, and the MM protocol in addition to location management of the mobile terminal MT initializes the connection encryption. A TAC protocol (Terminal Association Control) establishes a connection between the network and the mobile terminal MT.

FIG. 6 shows a signaling chart for initialization of the IMT-2000 system encryption. The encryption initialization is performed with an MM-T protocol (Mobility Management-Terminal) in a transparent way from the point of view of the radio access network RAN. The MSC transmits, by means of the MM-T protocol, an encryption initialization message 61 MOBILITY_FACILITY_ (START_CIPHERING: INVOKE) to the mobile terminal MT. The radio access network RAN transfers the message directly to the MT, which acknowledges the encryption initialization with message 62 MOBILITY_FACILITY (START_CIPHERING: RETURN_RESULT). Message 62 is also transferred to the MSC transparently from the RAN's point of view. The base station BTS and the base station controller BSC of the RAN, through which the messages pass, thus do not take part in the encryption and are not aware of the encryption. After the initialization, the encryption of the connection is performed between the mobile services switching centre MSC and the mobile terminal MT.

Hence, the problem with the system configuration of FIG. 2 is that the mobile services switching centre does not support direct transfer of encryption settings to the mobile terminal transparently over the radio access network RAN. A further problem is that the base station BTS of the RAN does not have a protocol to process the encryption settings, which could communicate with the corresponding protocol of the mobile terminal. This means that encryption initialization cannot be carried out between the base station and the mobile terminal. In a system configuration according to FIG. 2, it is therefore not possible with prior art methods to arrange encryption for the connection.

SUMMARY OF THE INVENTION

It is an object of the present invention to implement encryption in a radio system configuration where the protocol processing the encryption settings of the base station is not able to communicate with the corresponding protocol of the mobile terminal.

This new type of encryption setting is obtained with the inventive method, which is characterized by that which is set forth in the independent claim 1. Particular embodiments of the invention are disclosed in the dependent claims.

The invention is based on the idea that the control unit in the radio network transfers the encryption initialization settings needed by the mobile terminal to the mobile terminal, transparently from the point of view of the base station. According to one of the embodiments of the invention, the control unit in the radio network transfers the encryption initialization settings independently to the base station and the mobile terminal.

Such an encryption setting provides the advantage that encryption can be arranged between units communication over the radio interface even in case the units are not able to exchange encryption initialization settings, as is the case with a combination of a GSM core network and an IMT-2000 system radio network.

BRIEF DESCRIPTION OF THE DRAWINGS

The invention will now be described in closer detail in connection with the preferred embodiment, with reference to examples of FIGS. 2, 5 and 7 in the accompanying drawings, in which.

DETAILED DESCRIPTION OF THE INVENTION

Figure 1:
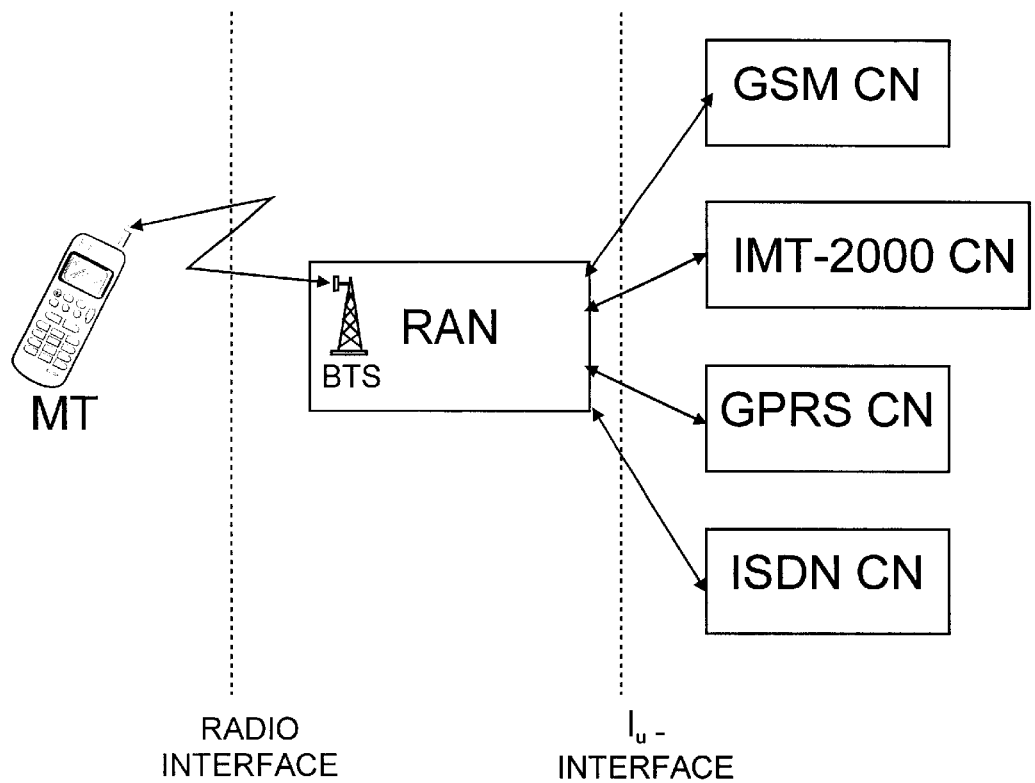
FIG. 1 is a block diagram illustration of a radio system based on joint use of the radio network.
Figure 2:
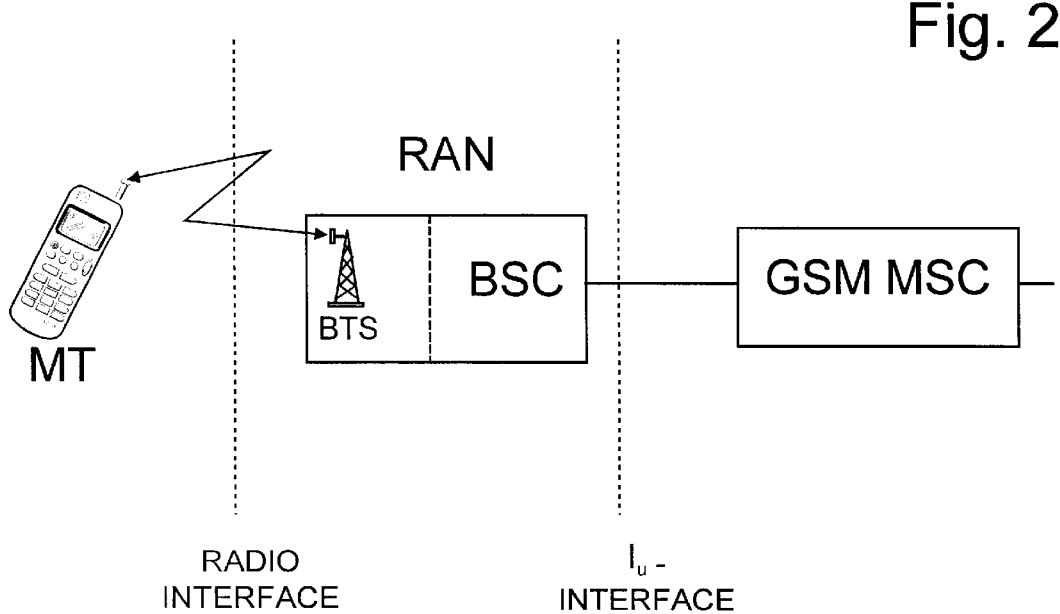
FIG. 2 shows the radio network of FIG. 1 connecting to a GSM core network.
Figure 3:
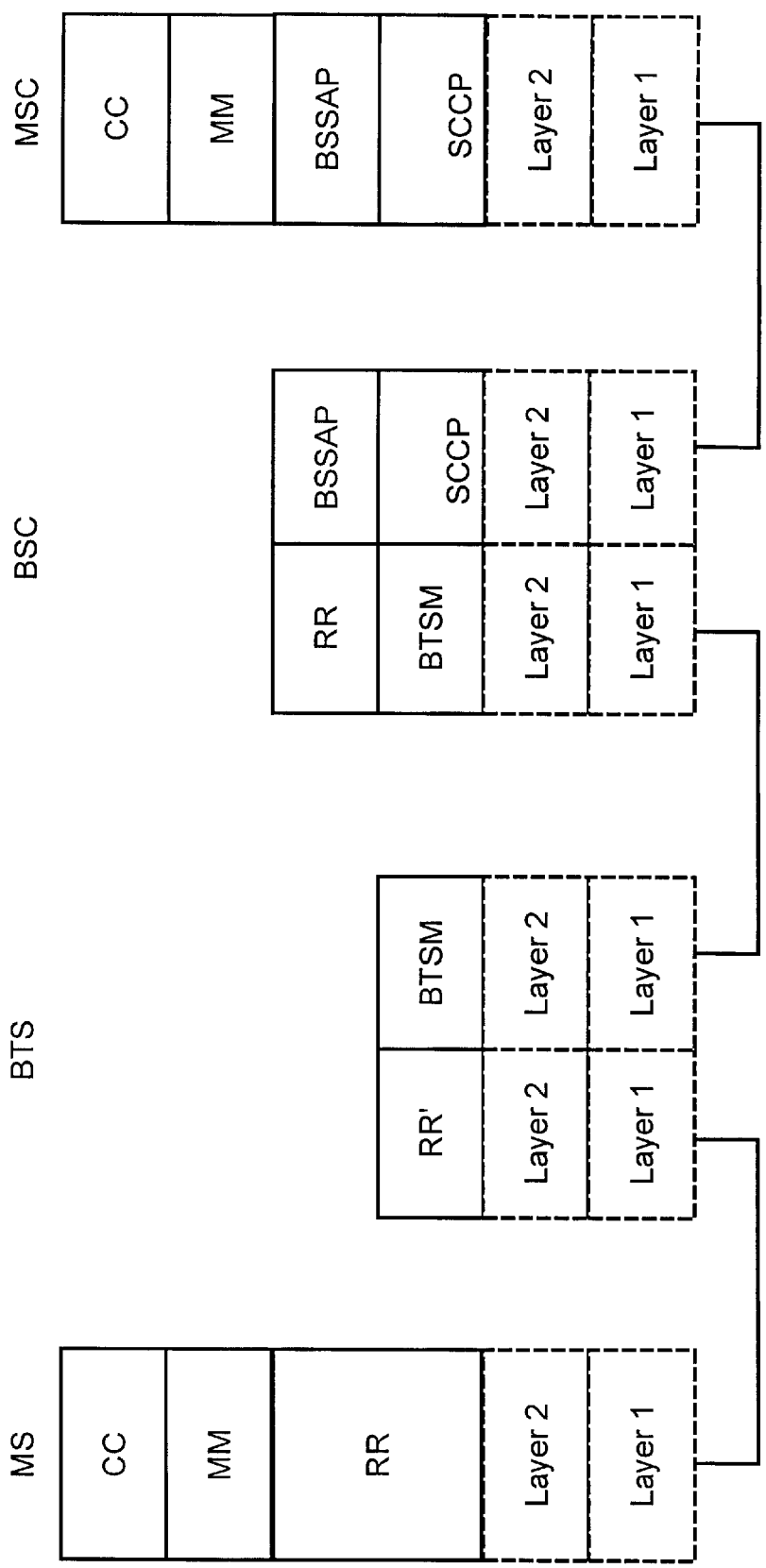
FIG. 3 shows the protocols that are essential from the point of view of the invention, for a connection in the GSM system as a layer depiction.
Figure 4:
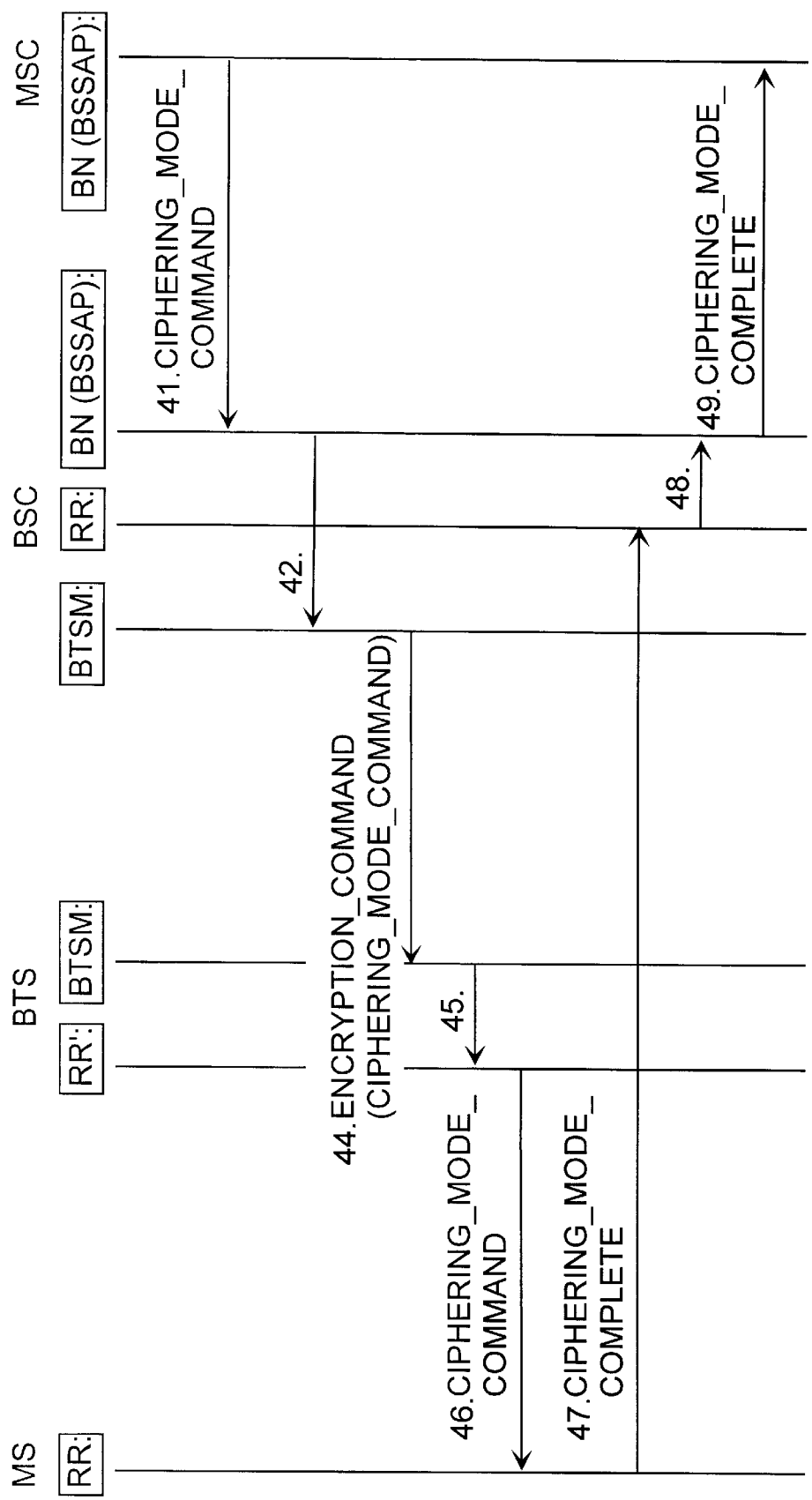
FIG. 4 is a signaling diagram of setting encryption to the GSM system.

The present invention is applicable to a combination of any radio systems. In the following, the invention is described by way of example mainly in connection with a combined core network of the digital GSM mobile communications system and the radio access network of the IMT-2000 system. FIGS. 1 and 2 show the simplified structure of the combination of the radio systems, described in the above. For a closer description of the GSM system, reference is made to the GSM recommendations and "The GSM System for Mobile Communications" by M. Mouly & M. Pautet, Palaiseau, France, 1992, ISBN: 2-9507190-0-7.

In the following, the invention will be described in greater detail in the light of its preferred embodiment, with reference to FIGS. 2, 5 and 7.

FIG. 2 shows the example of the combination of radio systems, described above, in which the GSM system core network is connected to the radio access network RAN. The mobile terminal MT is adapted to communicate with the GSM core network over the RAN, so that the protocol stack of the mobile terminal, shown in FIG. 5, consists of the GSM system MM and CC protocols, and otherwise of protocols required by the RAN, i.e. of the IMT-2000 system protocols in the case of FIG. 5. If need be, the encryption settings can be handled at RBC (Radio Bearer Control) and BC (Bearer Control) protocol layers in the protocol structure of the RAN, and at the RBC protocol layer in the mobile terminal MT.

Figure 5:
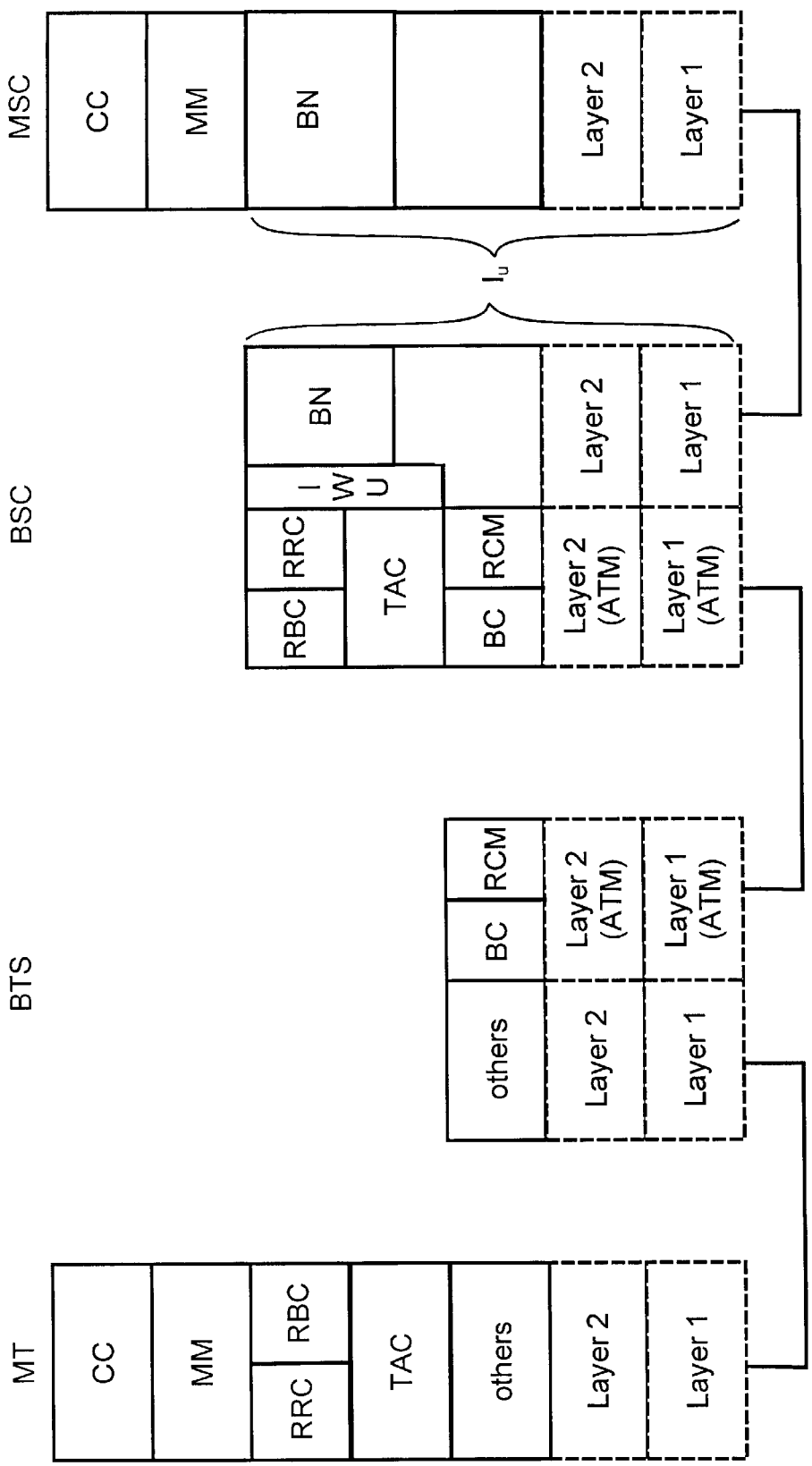
FIG. 5 shows the protocols that are essential from the point of view of the invention, for a connection in the IMT-2000 system as a layer depiction.
Figure 6:
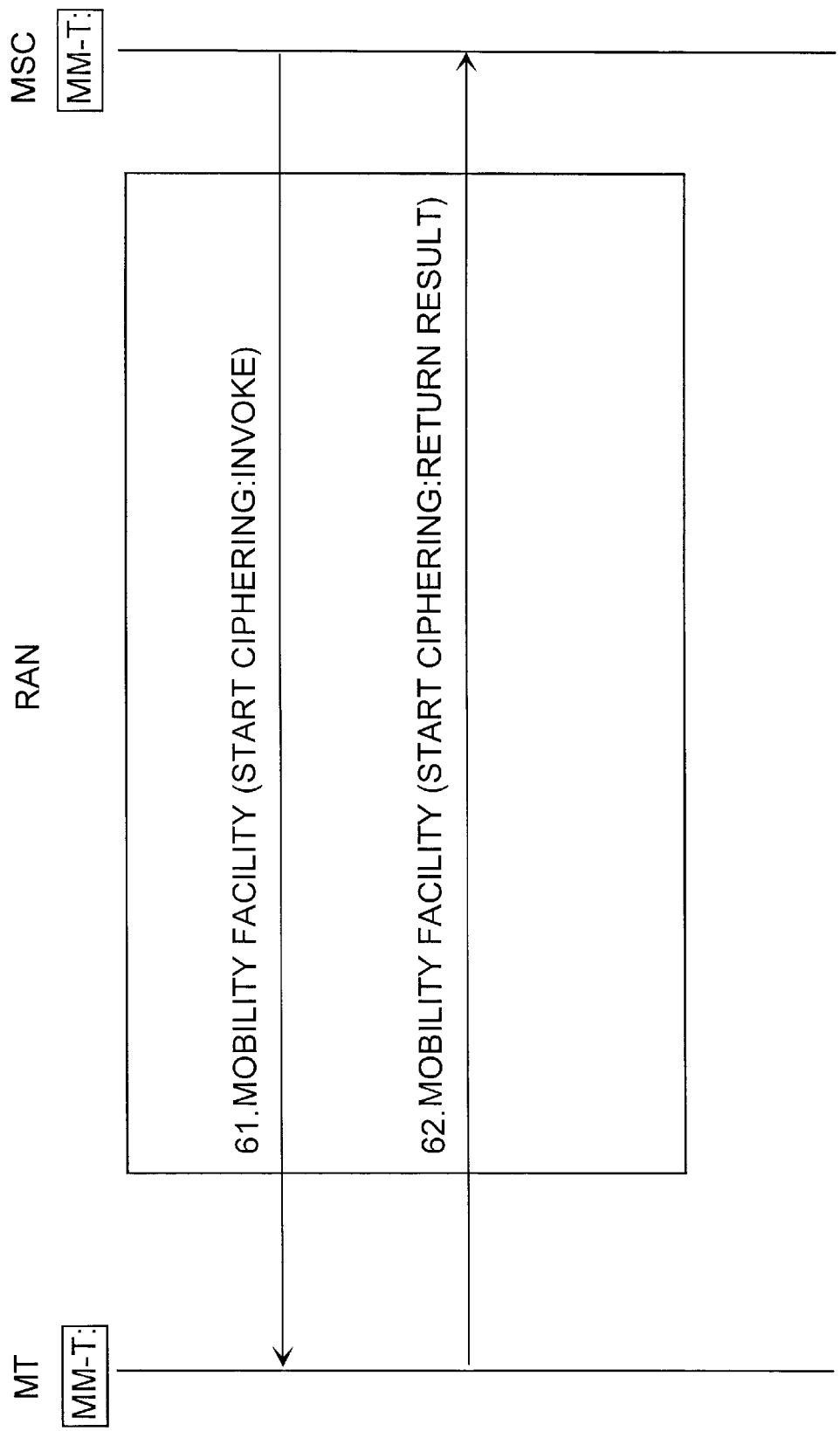
FIG. 6 is a signaling diagram of initialization of encryption in the IMT-2000 system.
Figure 7:
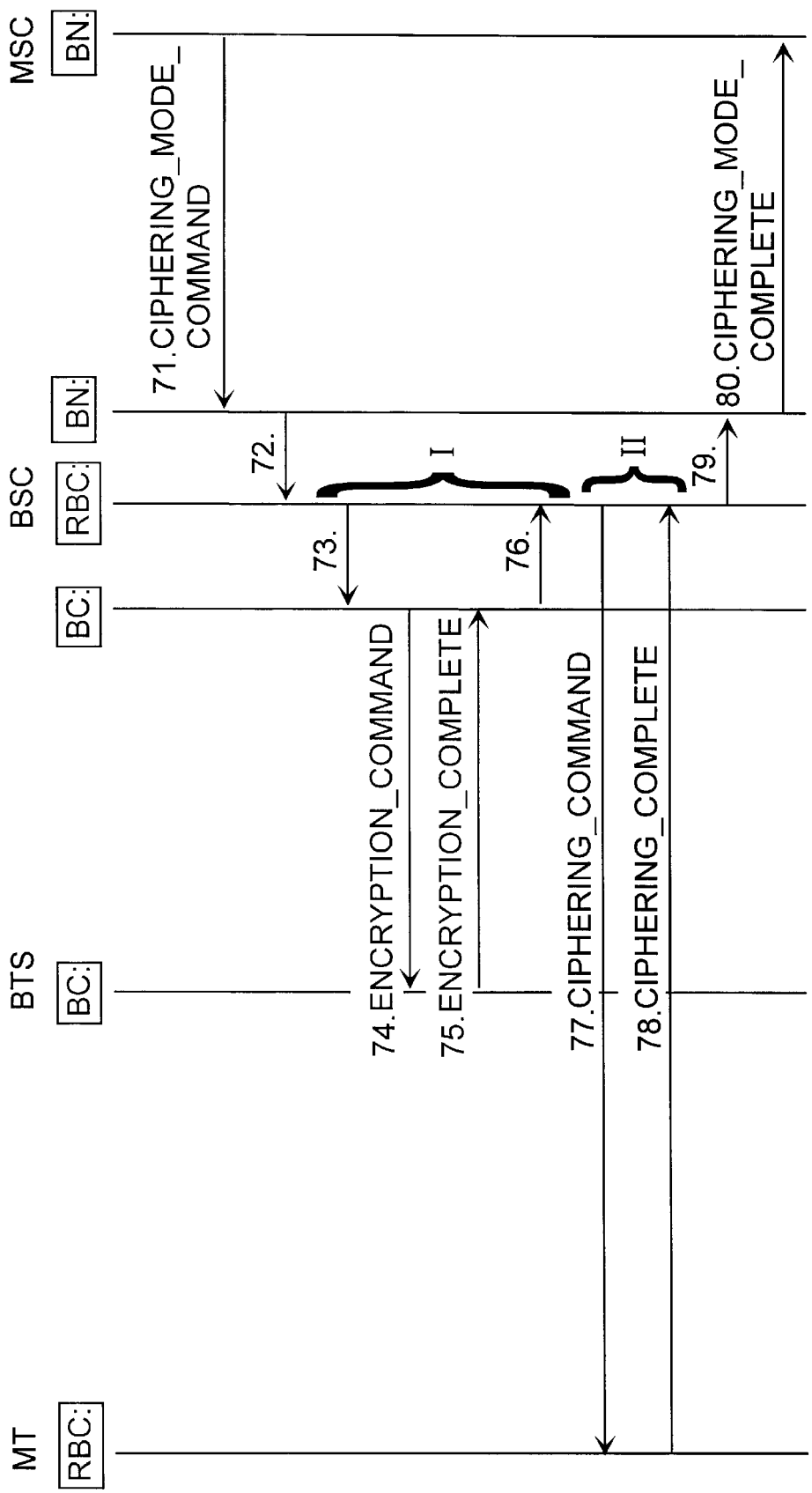
FIG. 7 is a signaling diagram of encryption setting according to the invention.

FIG. 7 is a signaling diagram for setting the inventive encryption at the protocol layers according to FIG. 5. At the beginning of setting the encryption, the mobile services switching centre MSC transmits a command message to the radio access network RAN to initialize encryption (message 71 CIPHERING_MODE_COMMAND). Message 71 is transmitted with e.g. the BN protocol of the GSM mobile services switching centre MSC, which is a protocol at layer 3 of the $I_u$ interface. The BN protocol of the base station controller BSC receives this command message and transfers it, BSC-internally, to the RBC protocol which handles encryption settings (message 72). Next, at two independent stages, the base station controller transfers the encryption start command on the one hand to the base station BTS and, on the other hand, to the mobile terminal MT. FIG. 7 shows these two stages, so that initially at the first stage the encryption start command is transferred to the base station BTS and then, at the second stage, to the mobile terminal MT. The signalings at the first and second stages may also be carried out at least partly simultaneously, depending on the processing capacity of the BSC. In FIG. 7, the first and second stages defined in the above are denoted with Roman numbers I and II.

In the exemplary case of FIG. 7, the BSC at the first stage defined above transfers, according to the present invention, the command message it has received from the MSC, from the RBC protocol further to a second BC protocol that handles encryption settings (message 73). The BC protocol of the base station controller transmits an encryption command (message 74 ENCRYPTION_COMMAND) to the BTS's corresponding protocol, which the base station BTS acknowledges with message 75 ENCRYPTION_COMPLETE. Messages 74 and 75 of the BC protocol between the base station controller BSC and the base station BTS are transferred on the transmission link using e.g. the ATM connection AAL5 protocol. BTS-internally, information on the encryption settings and the start of encryption is forwarded to the physical transmission layer that takes care of the encryption process, after which the protocol of the physical transmission layer starts decryption with the given parameters, and, having received the first encrypted message from the mobile terminal MT, it also begins encryption with the given parameters. The BC protocol of the base station controller transfers the acknowledgement message of the base station forward to the RBC protocol BSC-internally (message 76).

At the second stage determined in FIG. 7, the RBC protocol of the base station controller sends an encryption start command 77 CIPHERING_COMMAND to the corresponding protocol of the mobile terminal MT. MT-internally, the RBC protocol transfers information to the physical transmission layer taking care of the encryption process on the encryption settings and the encryption start, after which the protocol at the physical transmission layer begins encryption and decryption with the given parameters. The mobile terminal MT acknowledges the encryption start message by transmitting message 78 CIPHERING_COMPLETE to the RBC protocol of the base station controller BSC. Messages 77 and 78 of the RBC protocol between the base station controller BSC and the mobile terminal MT are transferred by using e.g. the ATM AAL2 protocol.

After the first and second stages have been completed, the RBC protocol of the base station controller transfers, BSC-internally, an acknowledgement to the BN protocol on the encryption settings having been sent to their destination (message 79). The BN protocol of the base station controller sends the acknowledgement message further to the corresponding BN protocol layer of the mobile services switching centre MSC (message 80 CIPHERING_MODE_COMPLETE).

Due to the setting of encryption, described above, the connection between the base station BTS and the mobile terminal MT can be encrypted over the radio interface. The proper encryption carried out over the radio interface is e.g. similar to that used in the GSM system.

Figure 8:
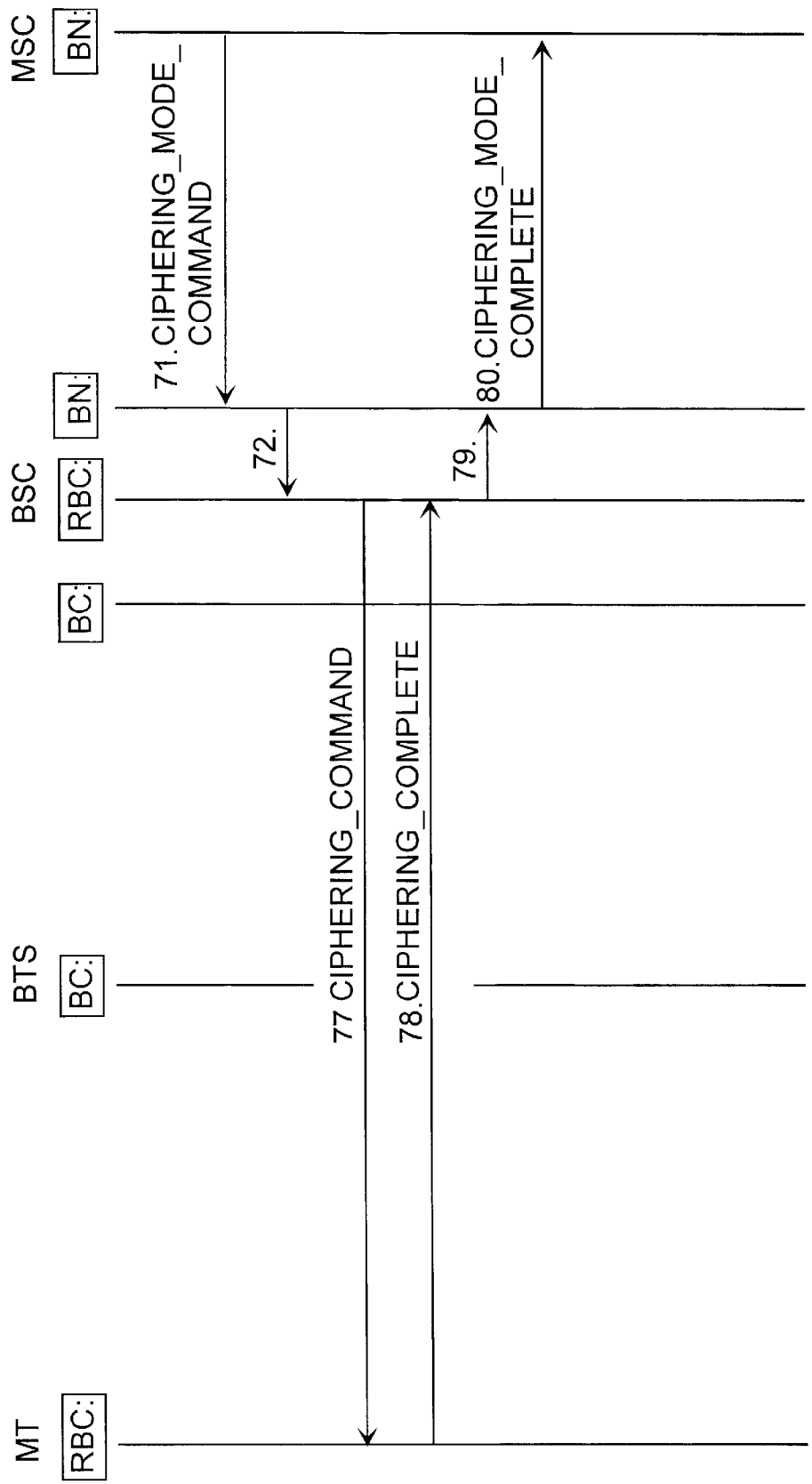
FIG. 8 is a signaling diagram of encryption setting according to the invention.

In another embodiment of the invention, the encryption setting is transferred from the base station controller BSC to the mobile terminal MT only, when connection encryption is implemented between the BSC and the MT. FIG. 8 shows this embodiment as a signaling diagram. At the beginning of encryption setting, the mobile services switching centre MSC transmits a command message to the radio access network RAN to initialize the encryption (message 71 CIPHERING_MODE_COMMAND), with e.g. the BN protocol. The BN protocol of the base station controller BSC receives this command message and transfers it, BSC-internally, to the RBC protocol that handles encryption settings (message 72). BSC-internally, information on the encryption settings and the start of encryption is transferred from the RBC protocol to the physical transmission layer that takes care of the encryption process, after which the protocol of the physical transmission layer starts decryption with the given parameters. Next, the RBC protocol of the base station controller sends an encryption start command 77 CIPHERING_COMMAND to the corresponding protocol of the mobile terminal MT. MT-internally, the RBC protocol transfers information to the physical transmission layer taking care of the encryption process on the encryption settings and the encryption start, after which the protocol at the physical transmission layer begins encryption and decryption with the given parameters. The mobile terminal MT acknowledges the encryption start message by transmitting message 78 CIPHERING_COMPLETE to the RBC protocol of the base station controller BSC. Message 78 may be transmitted encrypted with the given parameters. Messages 77 and 78 of the RBC protocol between the base station controller BSC and the mobile terminal MT are transferred between the BSC and the BTS by using e.g. the ATM ML2 protocol. Next, the RBC protocol of the base station controller transfers, BSC-internally, an acknowledgement to the BN protocol on the encryption settings having been sent to their destination (message 79). The BN protocol of the base station controller sends the acknowledgement message further to the corresponding BN protocol layer of the mobile services switching centre MSC (message 80 CIPHERING_MODE_COMPLETE). The protocol of the BSC physical transmission layer starts encryption with the given parameters once it has received the first message encrypted with these parameters from the mobile terminal MT.

In the second embodiment of the invention, encryption settings of an existing connection are changed in the middle of the connection, with e.g. the signaling shown in FIG. 7 being used to transfer the new encryption settings to the units handling the physical encryption. In the following, the second embodiment of the invention is described in greater detail with reference to FIG. 7.

In the second embodiment of the invention, the encryption setting messages 71–73 are transferred the way described above in connection with the preferred embodiment of the invention. Further, at the first step of the second embodiment, the base station controller BSC transfers encryption setting message 74 to the base station BTS by using e.g. the BC protocol. The base station acknowledges this message with message 75. The acknowledgement is transferred, BSC-internally, in message 76 as described above in connection with the preferred embodiment. BTS-internally, the new encryption settings and information on the change in the encryption are transferred to the physical transmission layer handling the encryption process, which, after receiving the new settings, continues encryption and decryption of the connection between the base station BTS and the mobile terminal MT according to the new settings, for example by changing the encryption algorithm being used.

At the second stage of the second embodiment, the base station controller BSC transparently transfers encryption setting message 77 to the mobile terminal MT via the base station, by using e.g. the RBC protocol. If the encryption setting message 77 is transmitted to the mobile terminal MT in encrypted form over the radio interface, the old encryption settings are employed for the encryption, for example the encryption algorithm to be changed into a new one. MT-internally, the new encryption settings and information on the change in the encryption are transferred to the physical transmission layer handling the encryption process, which, after receiving the new settings, continues encryption and decryption of the connection between the base station BTS and the mobile terminal MT according to the new settings, for example by changing the encryption algorithm being used. The mobile terminal MT acknowledges reception of the new encryption settings with message 78. Again, if acknowledgement message 78 is to be transmitted in encrypted form at the radio interface, the new encryption settings delivered in encryption setting message 77 are used, e.g. the new encryption algorithm. Acknowledgement messages 79 and 80 are transferred the way described in connection with the preferred embodiment of the invention.

The drawings and the description related thereto are only intended to illustrate the idea of the invention. The inventive method may vary in details within the scope of the claims. The messages and protocol layers according to the example described in the above represent but one implementation alternative and the invention is therefore not restricted to transmission of these messages or the presented protocol layers. Although the invention is in the above described mainly in connection with a combination of a radio access network RAN of the IMT-2000 system and the GSM core network, the method is applicable for use in another type of radio system, particularly in case the units taking part in the encryption cannot communicate encryption settings to one another directly. The invention can be employed in a public radio system formed as a combination of the radio access network RAN, or similar, of the IMT-2000 system and the switching centre of a core network, in which encryption settings are not transferred transparently from the switching centre to the mobile terminal over the radio network.

What is claimed is:

1. A method of setting encryption for a connection in a radio system which comprises a plurality of mobile terminals, at least one switching center and at least one radio access network unit communicating with the switching center, the radio access network further comprising at least one control unit and, under its control, at least one base station, wherein commands are transmitted in the system using a plurality of protocol layers and wherein handling of encryption settings between the switching center and the base station in the radio system is carried out at different protocol layers than the handling of encryption settings of the mobile terminals, the method comprising the steps of:

transmitting an encryption setting from the switching center to the control unit of the radio access network unit;

encrypting the connection between the radio access network unit and the mobile terminal with the encryption settings, and transferring the encryption setting from the control unit to the mobile terminal transparently from the base station point of view.

2. A method as claimed in claim 1, in which the connection between the base station and the mobile terminal is encrypted with the encryption settings, wherein the method comprises the step of:

transferring the encryption setting from the control unit to the base station for exclusive use by the base station.

3. A method as claimed in claim 2, further comprising the steps of:

transferring the encryption setting from the control unit to the base station with a first protocol; and transferring the encryption setting from the control unit to mobile terminal with a second protocol, which is different than the first protocol.

4. A method as claimed in claim 3, further comprising the steps of:

transmitting a message from the control unit to the base station to inform the base station of the encryption settings;

transmitting a message from the base station to the control unit to acknowledge the encryption settings of the base station;

transmitting a message from the control unit to the mobile terminal to inform the mobile terminal of the encryption settings; and transmitting a message from the mobile terminal to the control unit to acknowledge the encryption settings of the mobile terminal.

5. A method as claimed in claim 4, wherein the acknowledgement message on the base station encryption settings is additionally transferred control unit internally from one protocol to the next.

6. A method as claimed in claim 4, further comprising the steps of:

encrypting the information message on the encryption settings to the mobile terminal with the old encryption setting; and encrypting the acknowledgement message on the encryption settings from the mobile terminal with the new encryption setting.

7. A method as claimed in claim 1, further comprising the step of:

transferring the encryption setting in the middle of the communication connection to change the encryption into another.

* * * * *